Oct. 30, 1945.  E. D. BUCHANAN  2,388,117
PIPE COUPLER
Filed Sept. 29, 1944.
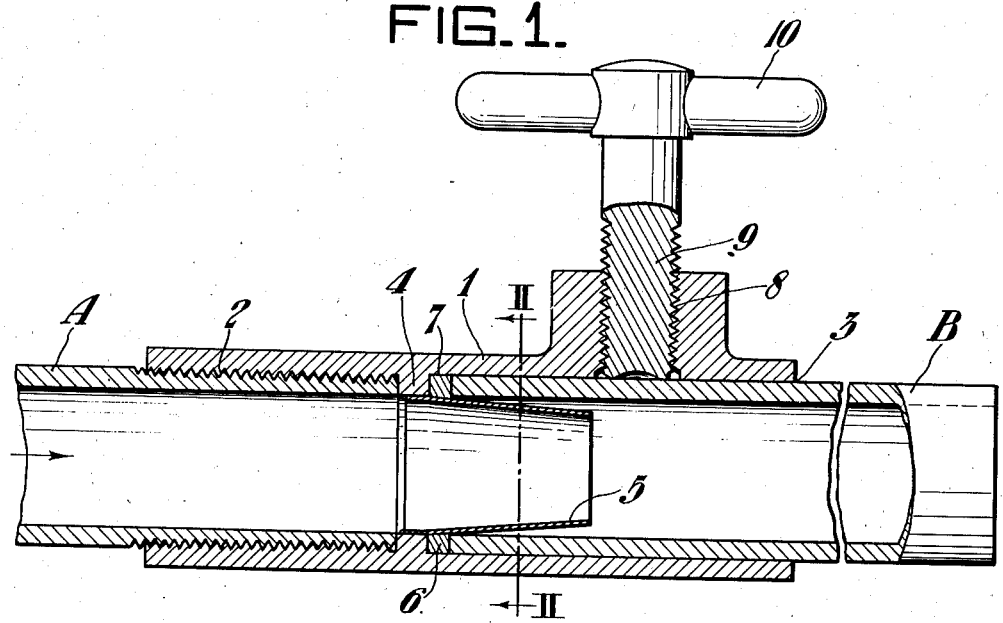
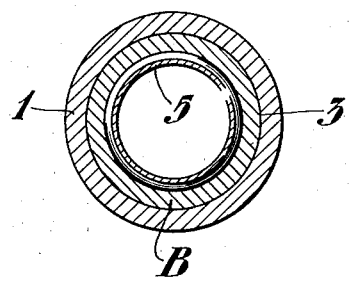
Inventor:
EDWARD D. BUCHANAN,
by: John E. Jackson
his Attorney.

Patented Oct. 30, 1945

2,388,117

UNITED STATES PATENT OFFICE 2,388,117

PIPE COUPLER

Edward D. Buchanan, Lorain, Ohio, assignor to National Tube Company, a corporation of New Jersey Application September 29, 1944, Serial No. 556,441

1 Claim. (Cl. 285—193)

This invention relates to improvements in pipe couplers, and more particularly to a coupler to which a pipe may be readily attached or detached.

In the operation of open hearth and other metallurgical furnaces, it is necessary from time to time to remove the clay packing from the tap holes thereof. This is partly done by compressed air delivered through a blow pipe and due to the high temperatures in the interior of the furnaces immediately adjacent the tap hole, the end of the blow pipe is rapidly destroyed thereby necessitating frequent replacement. Thus, it is advantageous to have a connector which does not require the blow pipe to be threaded or be formed in any special manner at the jointing end thereof.

It is accordingly an object of my invention to provide a coupler for plain end pipe.

It is a further object to provide a coupler to which pipe may be readily attached or detached.

The foregoing and further objects will be apparent from the specification and drawing wherein:

Figure 1 is a longitudinal section; and

Figure 2 is a vertical section on line II—II of Figure 1.

Referring more particularly to the drawing, the numeral 1 indicates the housing of a coupler which is suitably affixed at one end to a supply pipe A, such as by screw threads 2. The opposite end is provided with a cylindrical bore 3 having a shoulder 4 at the inner end thereof. A tapered thimble or nipple 5 is welded or otherwise secured to the shoulder 4. An annular packing member 6 is inserted in the annular space 7 between the nipple 5 and the housing 1 at the inner end thereof abutting the shoulder 4. The width of the annular space 7 adjacent the outer end of the packing 6 is approximately the same as the wall thickness of a plain end pipe to be received therein. The housing 1 is suitably tapped as at 8 just beyond the end of the nipple 5 to receive a set screw 9, which may be provided with a handle 10 to permit manual rotation thereof.

In operation, the supply pipe A is connected to a source of air under pressure which may be admitted thereto by a suitable valve (not shown). The set screw 9 is retracted sufficiently to permit the plain end blow pipe B to be inserted in the annular space 7 and pressed against the packing 6. The set screw 9 is then tightened against the blow pipe B to retain it in the housing 1 and against the packing 6. Air admitted under pressure to the supply pipe A will then be transmitted to the blow pipe B through the coupler. Should there be any leakage through the annular space 7 past the packing 6, air will be aspirated therethrough into the blow pipe B, thereby preventing any of the fluid under pressure from escaping to the outside of the coupler.

While I have shown and described one specific embodiment of my invention, it will be understood that this embodiment is merely for the purpose of illustration and description and that various other forms may be devised within the scope of my invention, as defined in the appended claim.

I claim:

A coupler for connecting plain end pipe to a source of fluid under pressure which comprises a tubular housing connected to the source of supply, said housing having a cylindrical chamber therein, the diameter of said chamber being slightly larger than the outer diameter of a section of plain end pipe to be telescoped therein to provide a close sliding fit therebetween, a shoulder at the inner end of said chamber, a tapered thimble having its larger end secured to said shoulder and extending outwardly therefrom into said chamber to form an annular space between the housing and the thimble, and means on said housing for releasably holding a section of plain end pipe inserted into said chamber, said thimble being constructed and arranged to cause air to be aspirated into said section of pipe when fluid under pressure is passed through said housing into a section of plain end pipe held therein thereby preventing escape of the fluid under pressure to the outside of said housing.

EDWARD D. BUCHANAN.